May 30, 1961  J. W. HART  2,986,141
PLASTIC CARTRIDGE AMPOULE
Filed Jan. 8, 1954
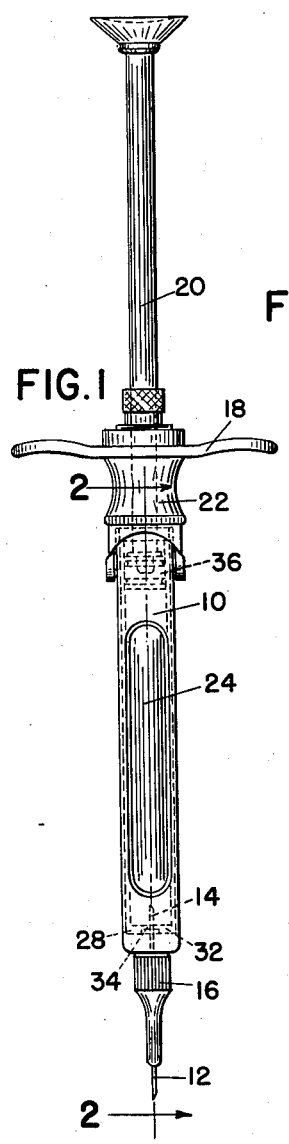
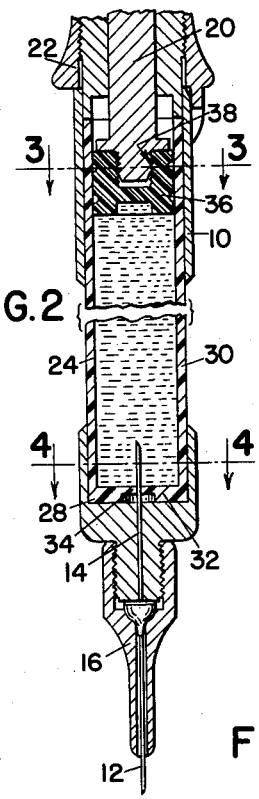
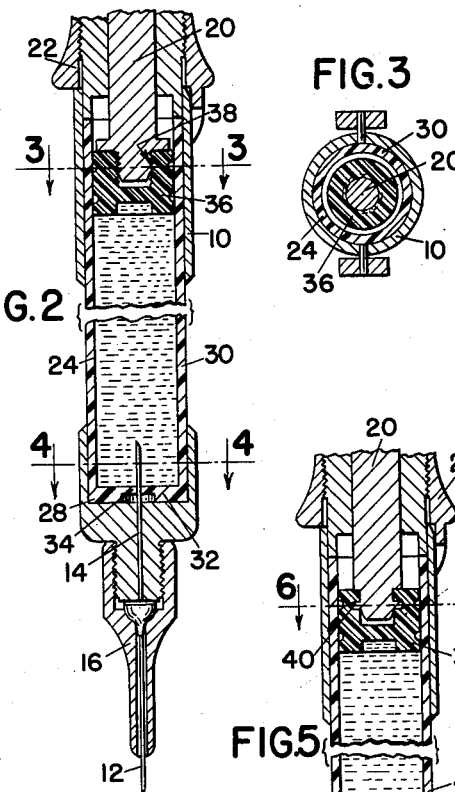
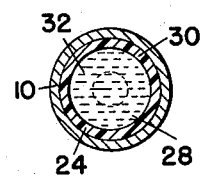
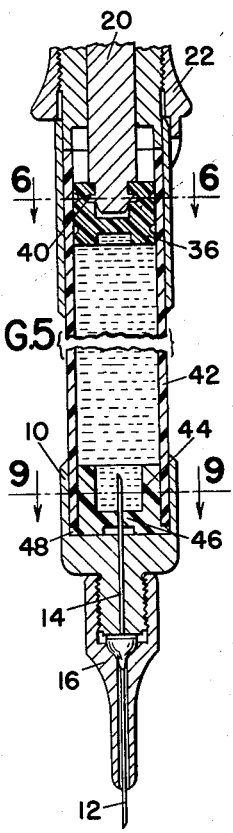
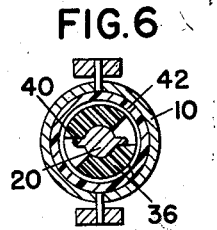
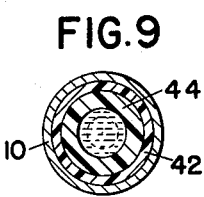
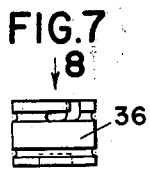
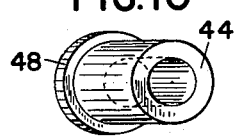
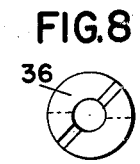
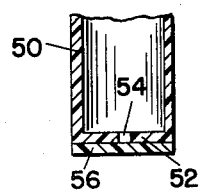
INVENTOR
JOHN W. HART
by Charles R. Fay,
ATTORNEY

United States Patent Office 2,986,141
Patented May 30, 1961

2,986,141

PLASTIC CARTRIDGE AMPOULE

John W. Hart, Albany, N.Y., assignor to Sterling Drug Inc., New York, N.Y., a corporation of Delaware Filed Jan. 8, 1954, Ser. No. 402,838

1 Claim. (Cl. 128—218)

This invention relates to a new and improved cartridge or ampoule particularly for containing medicaments for use in syringes of the cartridge-type, and the principal object of the present invention resides in the provision of such a cartridge or ampoule which is made of plastic as opposed to the glass cartridges of the prior art.

Glass tubing is used to make cartridges or ampoules for use in cartridge-type syringes, and the glass tubing is drawn and cannot be held to tolerances sufficiently close for making predetermined sizes of cartridges. Each such cartridge is provided with a diaphragm at one end for closing the same and for receiving the hypodermic needle, and at the other end it is provided with a movable plunger which is engaged by the piston of the hypodermic syringe to express the contents through the needle. In the manufacture of prior art glass cartridges, it is necessary to provide three different sizes of glass tubing and three different sizes of plungers and diaphragms, and in assembling the parts, the individual glass tubes all have to be gauged and fitted with an appropriate diaphragm and plunger in order to provide for proper operation without leaking.

The present inventor has done away with this difficulty by providing a plastic cartridge and this invention contemplates the use of extruded plastic tubing provided with a diaphragm or separate cap and sliding plunger, by which means but one size of tubing, diaphragm or cap, and plunger is required; and the invention also contemplates the use of molded plastic cartridges wherein the diaphragm or cap is molded integrally therewith and it remains only necessary to provide the molded plastic cartridge with one size of movable plunger for operation as above stated.

Further objects of the invention include the provision of plastic cartridges as above described wherein there is no leaking at the needle and wherein the manufacture of the cartridges is made much faster and much less expensive while the new device is fully as efficient and useful as glass cartridges of the prior art while also providing improvements in operation.

Other objects and advantages of the invention will appear hereinafter.

Reference is to be had to the accompanying drawings, in which:

Fig. 1 is a view in elevation of a hypodermic syringe in which the present invention is utilized;

Fig. 2 is a section on an enlarged scale on lines 2—2 of Fig. 1 and illustrating one form of the invention, parts being broken away;

Figs. 3 and 4 are sections on lines 3—3 and 4—4 respectively of Fig. 2;

Fig. 5 is a sectional view similar to Fig. 2 but showing a modification;

Fig. 6 is a section on line 6—6 of Fig. 5;

Fig. 7 is a view in elevation of a cartridge plunger;

Fig. 8 is a plan view thereof, looking in the direction of arrow 8 in Fig. 7;

Fig. 9 is a section on line 9—9 of Fig. 5;

Fig. 10 is a perspective view of the diaphragm or end cap for the cartridge shown in Fig. 5; and Fig. 11 is a sectional view illustrating a modification.

Plastic tubing may be extruded and held to tolerances sufficiently practical for the manufacture of cartridge-type ampoules or the like as distinct from the manufacture of glass for this purpose, and the present inventor has discovered that the cartridges may be injection molded and likewise held to close enough tolerances for the purposes required. It is pointed out that the conventional cartridge-type of ampoule comprises a glass tube closed at one end by a rubber diaphragm which is punctured by a double-ended hypodermic needle immediately before injection, and at the other end the glass tubes are provided with rubber plungers which are engaged by the hypodermic syringe pistons to exert sufficient force on the medicament within the cartridge to express the same through the needle. Obviously, the rubber plungers of the cartridges must not leak or allow medicaments to escape therepast and also it is clear that when the double-ended hypodermic needle punctures the rubber diaphragm, there must be no leakage about the needle, and all of the medicament must be forced through the needle.

The above considerations have been found to raise serious problems in the manufacture of plastic cartridge-type ampoules, and the present invention provides constructions and materials which overcome objections to plastic ampoules of the present type.

In Fig. 1 there is illustrated a hypodermic syringe having a barrel 10, a double-ended needle 12, 14 held to the barrel by a member 16, a finger-grip 18 and a hypodermic piston 20. The finger-grip 18 is located on a ferrule 22 which may be swung with relation to the barrel 10 so as to provide for insertion of a cartridge 24 into the barrel. Upon swinging the ferrule portion 22 back to the position shown in Fig. 1, the entire cartridge may be moved downwardly so that the end of the needle at 14 penetrates the diaphragm. Application of pressure to the plunger 36 will then of course eject the medicament.

In the present case, the invention provides a cartridge best shown in Fig. 2 which comprises an injection-molded, plastic, tubular body portion 30 which is open at its upper end and is closed at its lower end by an integral barrier 32. This barrier is in the form of a diaphragm or the like and is provided with a central reduced portion 34 which receives the inner part 14 of the hypodermic needle and is punctured thereby as described above.

The upper end of the cartridge is closed by a cartridge plunger 36 which also may be of molded plastic and is provided with inter-engaging means at 38, such as screw-threads as shown in Fig. 2, or the bayonet joint shown at 40 in Fig. 5, for connection to the piston 20 of the hypodermic syringe.

When the main body member 30 and its barrier or diaphragm 32 is injection molded, it is made of a polymerized ethylene which is polymerized to an extent sufficient to cause the material thereof to become relatively soft and yielding. The effect of this material is somewhat like that of rubber but it is not as soft, and the movable plunger 36 may be injection molded with close enough tolerance so that but a single plunger size is required to cooperate with the interior diameter of the main body portion 30 without allowing any by-blow or leaking. At the same time, when the polyethylene material in the diaphragm or barrier is pierced by the needle 14, the polyethylene grips the needle in such a way as to prevent any leakage at this point and extreme pressure may be applied without dislodging the needle and without causing any leakage, so that the entire contents may be expressed safely and as desired. As a matter of fact, under pressure, the cartridge itself may burst in the side portions thereof if the needle is plugged before the needle will become dislodged or leak.

If, on the other hand, a plastic tubing which is made by extrusion is to be used, this material may be harder than the polyethylene and may be in the nature of polystyrene. In this case also, the interior dimension of the extruded tubing may be held to such a tolerance as to provide a practically leakless cartridge ampoule. A construction according to this part of the invention is illustrated in Fig. 5 at 42, wherein is shown a straight open-ended tubular member, in one end of which is provided the same plunger 36 as before described. This plunger, however, is preferably made of polyethylene in order to provide a tight fit and sufficient side surface deformation so as to be completely leakproof.

At the other end of the tube or main body portion 42, there is inserted a separate plug or cap 44 which is itself tubular in form closely conforming to the interior wall of the tubular main body portion 42 and having a reduced central portion as at 46 to receive the needle 14.

In this case, there may be provided a circular flange 48 integral with the plug or cap 44, and this acts as a gasket when the main tubular body portion 42 is pushed downwardly to seat the cartridge and to pierce the diaphragm with the needle.

In the Fig. 2 construction there is no need for such a flange, because of the soft yielding nature of the material of which the entire cartridge 30 is molded in this construction.

A third form of the invention is illustrated in Fig. 11 wherein the cartridge may be injection molded of polystyrene as indicated at 50 with a substantially closed end 52 having, however, a central aperture 54 for reception of the needle. In this case, a polyethylene disc 56 may be cemented to the end surface as shown to provide a seal, diaphragm, and gasket as above described, and the operation of the cartridge will be substantially the same as those previously described.

It will be seen that this invention provides a plastic cartridge-type of ampoule which avoids the difficulties of the prior art glass type and which is much cheaper and easier and faster to manufacture. This invention contemplates several different forms, any one of which may be used within the scope of the invention. The cartridges may be injection molded or extruded and of course the forms shown in Figs. 5 and 11 may be molded or extruded of polyethylene with separate polyethylene parts, but it would be of course simpler to provide for injection molding the entire cartridge as in Fig. 2. The primary reasons for the separate plug or cap 44 and diaphragm 56 is in cases where it is desired to extrude a hard material such as polystyrene for the main body portion of the cartridge-type ampoule.

Having thus described my invention and the advantages thereof, I do not wish to be limited to the details herein disclosed, otherwise than as set forth in the claims, but what I claim is:

The combination with a hypodermic syringe including a barrel for receiving a disposable cartridge, a piston on the syringe for exerting pressure on a cartridge in the barrel, and an attached needle opposite the piston, of a separate disposable puncturable cartridge ampoule comprising a plastic cylindrical tubular main body member open at one end, means closely adjacent the other end thereof and closing the same, a movable cartridge plunger located in and closing the open end of the cartridge body member and adapted for exerting pressure on the contents held between the closed end and the cartridge plunger, means on the cartridge plunger for sealing engagement with the main body member, said end-closing means comprising a plastic barrier having a reduced portion puncturable by the hypodermic needle, said plastic barrier being integral with the main body member and the main body member and barrier being of relatively soft yielding material having the quality of closely surrounding the puncturing needle to prevent leakage of the contents past the needle, and a releasable connection between the syringe piston and the cartridge plunger.

References Cited in the file of this patent

UNITED STATES PATENTS

| | | |
|---|---|---|
| 978,488 | Roesch | Dec. 13, 1910 |
| 2,022,369 | Curtis | Nov. 26, 1935 |
| 2,228,537 | Smith | Jan. 14, 1941 |
| 2,473,733 | Smith | June 21, 1949 |
| 2,512,568 | Saffir | June 20, 1950 |
| 2,540,461 | Smith | Feb. 6, 1951 |
| 2,616,420 | Hart | Nov. 4, 1952 |
| 2,648,334 | Brown et al. | Aug. 11, 1953 |